(12) United States Patent
Pfändler et al.

(10) Patent No.: US 7,320,067 B2
(45) Date of Patent: Jan. 15, 2008

(54) METHOD FOR REPROGRAMMING A FIELD DEVICE

(75) Inventors: Martin Pfändler, Maulburg (DE);
Arthur Schrock, Weitenau (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 462 days.

(21) Appl. No.: 10/221,176

(22) PCT Filed: Mar. 20, 2001

(86) PCT No.: PCT/EP01/03145

§ 371 (c)(1),
(2), (4) Date: Dec. 23, 2002

(87) PCT Pub. No.: WO01/71439

PCT Pub. Date: Sep. 27, 2001

(65) Prior Publication Data

US 2003/0097521 A1    May 22, 2003

(30) Foreign Application Priority Data

Mar. 22, 2000    (DE)    ................................ 100 14 272

(51) Int. Cl.
*G06F 9/00*    (2006.01)
*G06F 1/26*    (2006.01)
(52) U.S. Cl. ........................... 713/1; 713/100; 713/300
(58) Field of Classification Search .................... 713/1, 713/100
See application file for complete search history.

(56) References Cited

U.S. PATENT DOCUMENTS

| | | | |
|---|---|---|---|
| 5,006,974 A * | 4/1991 | Kazerounian et al. | ........ 363/60 |
| 5,053,990 A * | 10/1991 | Kreifels et al. | ............. 711/103 |
| 5,126,808 A * | 6/1992 | Montalvo et al. | ....... 365/185.09 |
| 5,659,705 A | 8/1997 | McNutt et al. | |
| 5,765,027 A * | 6/1998 | Wang et al. | ................... 710/40 |
| 5,790,965 A * | 8/1998 | Abe | ........................... 701/29 |
| 5,826,205 A * | 10/1998 | Koelle et al. | ................. 701/29 |
| 5,937,198 A | 8/1999 | Nelson et al. | |
| 5,994,892 A * | 11/1999 | Turino et al. | ................ 324/142 |
| 6,232,893 B1 * | 5/2001 | Cliff et al. | ..................... 341/78 |
| 6,236,260 B1 * | 5/2001 | Vest et al. | ................... 327/536 |
| 6,292,718 B2 * | 9/2001 | Staiger | ........................... 701/1 |
| 6,295,230 B1 * | 9/2001 | Madurawe et al. | .... 365/185.28 |
| 6,535,811 B1 * | 3/2003 | Rowland et al. | ............ 701/115 |
| 6,631,520 B1 * | 10/2003 | Theron et al. | .............. 717/173 |
| 6,651,178 B1 * | 11/2003 | Voegeli et al. | .............. 713/300 |

FOREIGN PATENT DOCUMENTS

| | | |
|---|---|---|
| DE | 4210676 A1 | 10/1993 |
| DE | 4425388 A1 | 1/1996 |
| DE | 19707436 A1 | 8/1998 |
| WO | WO 94/28549 | 12/1994 |

OTHER PUBLICATIONS

Microsoft Press Computer Dictionary, Microsoft Press, second edition, 1994, pp. 413 and 414, "voltage regulator".*

* cited by examiner

*Primary Examiner*—Dennis M. Butler
(74) *Attorney, Agent, or Firm*—Bacon & Thomas, PLLC

(57) ABSTRACT

According to a method for reprogramming a field device, the current supply of the field device is increased in the programming mode. This enables electrically deletable and reprogrammable memories to be used in field devices.

2 Claims, 1 Drawing Sheet

METHOD FOR REPROGRAMMING A FIELD DEVICE

TECHNICAL FIELD

The invention relates to a method for reprogramming a field device and to a field device so reprogrammed.

BACKGROUND OF THE INVENTION

In automation and process control technology, field devices are used in many ways that measure process variables in the process sequence (sensors) or that control controlled variables (actuators).

Field devices for determining flow, fill level, differential pressure, temperature, etc. are widely known. For detecting the corresponding process variables, that is, mass or volume flow, fill height, pressure, temperature, etc., the field devices are disposed in the immediate vicinity of the process component involved.

The field devices furnish a measurement signal which corresponds to the measured value of the process variable detected. This measurement signal is carried to a central control unit (such as a control station or process control system). As a rule, the process control is done entirely from the control unit, where the measurement signals of various field devices are evaluated and as a function of the evaluation control signals for actuators that control the process sequence are generated.

As an example of an actuator, a controllable valve that regulates the flow of a liquid or gas in a pipeline segment can be named.

The signal transmission between the field device and the control unit can be done in analog or digital form (for instance via a current loop or a digital data bus).

Known international standards for signal transmission include for instance 4- to 20-mA current loops, HART, PROFIBUS, FOUNDATION FIELDBUS, or CAN bus.

Along with analog field devices, programmable field devices are being increasingly used. Often, ASICs (application-specific integrated circuits) and SMDs (surface mounted devices) are used for this purpose.

In the programmable field devices, more and more "intelligence" is thus shifted in the field to the actual site of use.

The applicable control program of the field device is stored in a nonvolatile memory in the field device and is executed in a microprocessor. This control program controls the operation, measurement and control functions, among others, of the field device.

In sensors that are used to detect measured values, normally larger control programs are used than in actuators that are used for only control purposes.

Because of the larger control programs, the versatility of the control programs in sensors is greater.

Various functionalities are possible; for instance, the way in which data is stored can vary; the calibration can be done with variable precision; data detection and data evaluation can differ; various regulating and adjusting functions can be employed; the type of signal transmission can differ; a more or less complicated self-monitoring (predictive maintenance) is possible, etc.

The field device, particularly as a sensor, no longer forwards merely a simple measurement signal but rather a prepared measurement signal, optionally with further additional information. The total of all these capabilities makes up the functionality of the field device.

For each functionality, a suitable control program (software) is required. The control program is normally stored in a nonvolatile memory in the field device.

The functionality of a field device thus depends decisively on the control program, which as a rule is made available by the manufacturer of the field device.

The control program can include certain basic functions or expanded functionalities.

The control program is normally implemented upon manufacture of the field device; that is, after production the functionality of the field device is fixedly specified and can no longer be altered in a simple way. In the event of program updates, or new functionalities (upgrades), replacement of the program is necessary.

One possibility is to replace the memory in which the control program is stored. This replacement must be done by skilled workers and is complicated.

Another possibility is not to replace the memory but instead to reprogram it. This can be done for instance with the aid of a portable operator control unit (such as a handheld computer or PC), which is connected to the field device. Via a suitable interface in the field device, the new control program is transferred from the operator control unit to the field device and is stored in memory in the field device.

For some time, electrically erasable and reprogrammable memories, known as flash memories or flash EPROMS, that allow simple reprogramming have been known.

However, one disadvantage of such memories is that the reprogramming requires a power supply that supplies strong current, which is above the normal basic current for field devices, and so these special memories are not used in field devices.

SUMMARY OF THE INVENTION

The object of the invention is to provide a method for reprogramming a field device with an electrically erasable and reprogrammable memory that is simple to perform.

This object is attained with the aid of the following method steps:

a) interruption of an ongoing first control program of the microprocessor and switchover from a normal operating mode to a programming mode;

b) increasing the power supply to the field device;

c) erasing the first control program in the memory by application of a voltage;

d) storing a second control program in the memory;

e) cancelling the programming mode and starting the second control program.

Only by increasing the power supply in the field device is reprogramming of the memory possible.

In a preferred feature of the invention, during the programming mode, a voltage pulse is generated at a control output of the microprocessor.

In a preferred feature of the invention, the second control program is read in via an interface provided in the field device.

The subject of the invention is also a field device that makes it possible to perform the method of the invention.

Such a field device has an electrically erasable and reprogrammable memory and a regulatable power supply unit.

Because the power supply of the field device is adjustable, the power supply of the field device can be increased above the basic current demand during reprogramming, and the reprogramming of the memory can thus be performed. In a preferred feature of the invention, the field device has a field bus interface as a connection to a digital data bus, and this interface serves as the power supply unit.

In a preferred feature of the invention, the field bus interface has a control input, whose resistance at the voltage zero point regulates the power supply of the field device.

In a preferred feature of the invention, the control input is connected to ground via two series-connected resistors, and the second resistor can be bridged by means of a transistor.

BRIEF DESCRIPTION OF THE DRAWINGS

The invention is explained in further detail below in terms of a preferred exemplary embodiment shown in the drawings. Shown are.

DESCRIPTION OF THE PREFERRED EMBODIMENT

Figure 1:
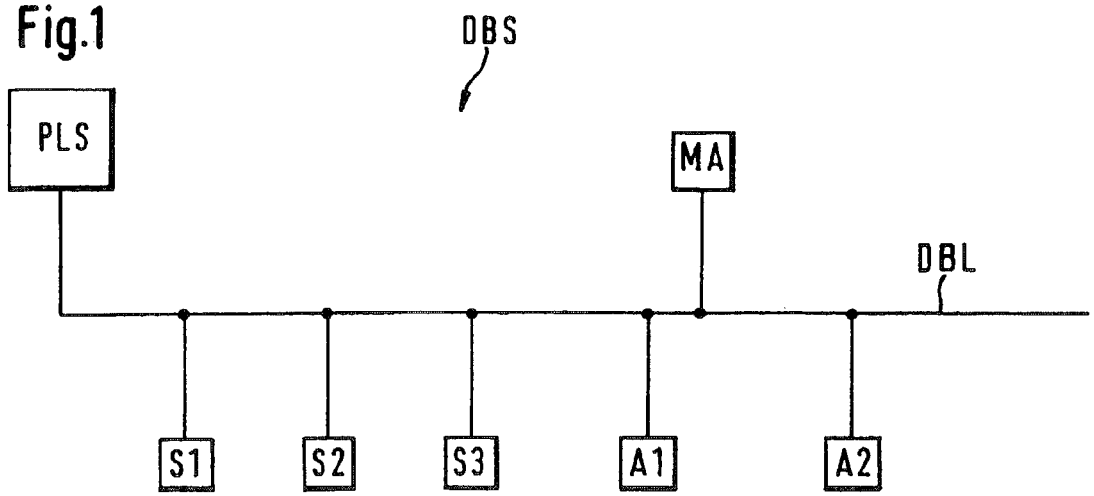
FIG. 1, which is a schematic illustration of a data bus system with a plurality of field devices.

In FIG. 1, a data bus system DBS with a plurality of field devices and with a process control system PLS is shown. The field devices involve sensors S and actuators A. The data bus participants communicate with one another via a data bus line DBL.

The process control system PLS is as a rule disposed in a control room, from which all the process control is done centrally. The sensors S and actuators A are disposed "in the field" in the various process components (tank, filling apparatus, pipeline, etc.).

The sensors S1, S2 and S3 detect the process variables of temperature T, pressure P and flow F, for instance, each at a particular process component. The actuators A1 and A2 are for instance valve controls that regulate the flow of a liquid or gas through a pipeline segment The data communication between the process control system PLS and the sensors S and actuators A is effected in a known manner in accordance with an internationally standardized transmission technique (such as RS 485 or IEC 1158), using special protocols (such as PROFIBUS or FOUNDATION FIELDBUS, CAN bus).

Figure 2:
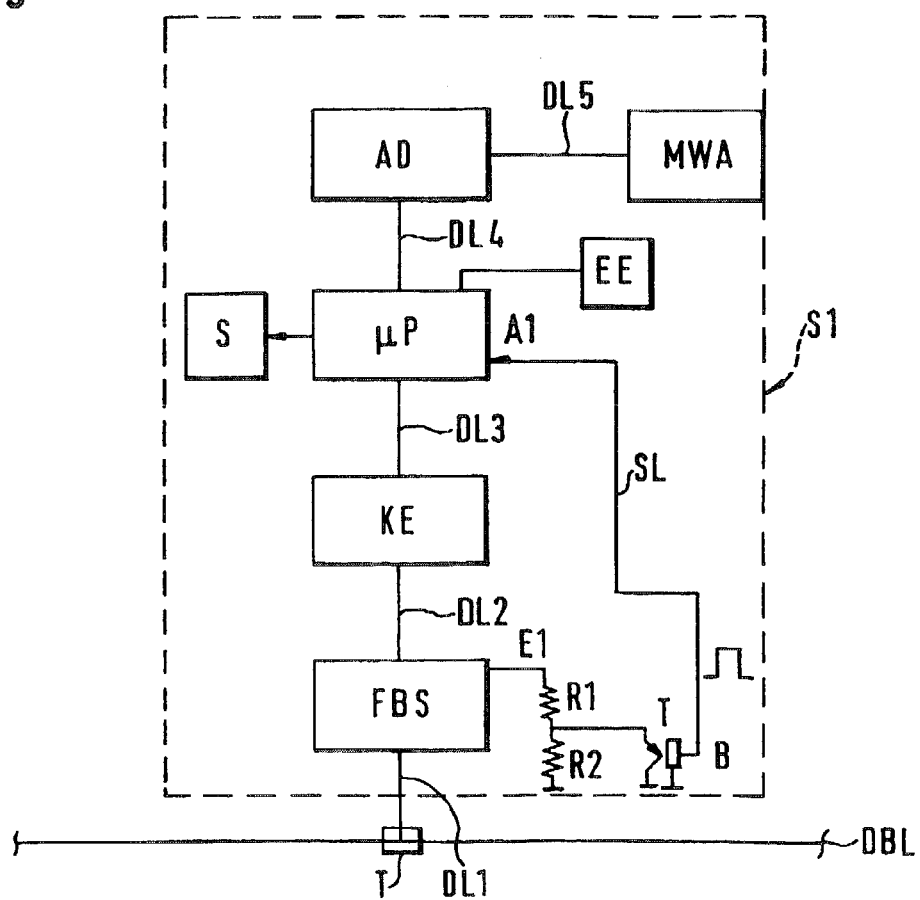
FIG. 2, which is a schematic illustration of a field device.

In FIG. 2, the sensor S1 is shown in further detail as an example of a field device. The sensor S1 is connected directly to the data bus line DBL. The connection is made by means of a T coupler T, which connected to a field bus interface FBS via a data line DL1. The field bus interface FBS supports all the transmission and reception functions for the transmission technique employed.

From the field bus interface FBS, a data line DL2 leads to a communications unit KE, which reads telegrams from the data bus line or itself writes telegrams to the data bus line DBL.

The communications unit KE communicates with a microprocessor μp via a data line DL3. The control program of the microprocessor μp is stored in a nonvolatile memory EE. The memory EE is a so-called electrically erasable and reprogrammable memory (flash memory or flash EPROM). The microprocessor μp is also connected to an interface S, which serves as a connection for an external memory unit, such as a portable personal computer. Via this interface S, control programs and data from external memories can be transmitted to the field device.

The microprocessor μp is also connected to a measured value pickup MWA via an A/D converter AD. The A/D converter converts the analog measurement signal of the measured value pickup MWA into a digital measured signal that is processed in the microprocessor μp.

From a control output A1 of the microprocessor μp, a control line SL leads to the base terminal B of a transistor T, whose emitter terminal E leads to a voltage divider, constructed of two resistors R1, R2, that is connected to one control input E1 of the field bus interface FSB.

The field bus interface FBS furnishes the entire power supply of the sensor S1.

According to the invention, the power supply level of the sensor S1 can be adjusted by means of the resistance between the control input E1 and the ground zero point.

This value is defined via the two resistors R1 and R2.

The method of the invention for reprogramming a field device is described in further detail below.

In a first method step, the ongoing control program of the microprocessor μp is interrupted, and the microprocessor μp switches over from a normal operating mode to a programming mode.

In a second method step, the power supply of the field device is increased;

in a third method step, the old control program in the memory EE is erased by application of a voltage;

in a fourth method step, the memory EE is written with a new control program;

in a fifth method step, the programming mode is cancelled, and the new control program is started.

Only by increasing the current can the memory EE be reprogrammed.

In a preferred feature of the method of the invention, during the programming mode, a voltage pulse is generated at a control output S1 of the microprocessor μp. With this voltage pulse, the power supply can be controlled. As long as the voltage pulse is applied, the field device requires more current.

The new control program is read in via the interface S. A portable operator control unit such as a PC (personal computer) or "handheld" can simply be connected to this interface S. The new control program is stored in a memory of this operator control unit and is transferred in a known manner.

The method of the invention can be employed only with a field device S1 that has an electrically erasable and reprogrammable memory EE. In addition, a regulatable power supply unit is needed. Regulatable power supply units are available commercially.

A regulatable power supply unit of this kind is provided by the field bus interface FBS.

The essential concept of the invention is to disclose a method and a device with which simple reprogramming of a field device is possible.

The invention claimed is:

1. A field device for detecting or controlling a process variable, having: a microprocessor; a memory in which a control program is stored that determines the function of the field device; a power supply unit; and means for regulating the output of said power supply unit, wherein:

said memory is electrically erasable and reprogrammable;

a field bus interface (FSB) serves as said power supply, said field bus interface being connected to a digital data bus (DBL); and said field bus interface (FBS) has a control input (E1) and associated resistance which serves as means for regulating said power supply unit and thus regulates said power supply of the field device.

2. The field device of claim 1 wherein:

said control input (E1) is connected to ground via two series-connected resistors (R1,R2) which serve as said means for regulating said power supply unit, and said second resistor (R2) can be bridged by means of a transistor (T).

* * * * *